United States Patent Office.

THOMAS M. FELL AND AMBROSE G. FELL, OF BROOKLYN, NEW YORK ASSIGNORS TO WILLIAM BELL, OF NEW YORK, N. Y.

Letters Patent No. 66,138, dated June 25, 1867.

IMPROVEMENT IN THE MANUFACTURE OF WHITE LEAD.

*The Schedule referred to in these Letters Patent and making part of the same.*

TO ALL WHOM IT MAY CONCERN:

Be it known that we, THOMAS M. FELL and AMBROSE G. FELL, of the city of Brooklyn, in the State of New York, have invented a certain new and useful Improvemnt in the Manufacture of White Lead; and do hereby declare the following to be a full, clear, and exact description thereof.

White lead made in the ordinary way is expensive because of the long and tedious process necessary in producing it, and when obtained is of a dark color, because it contains free metallic lead. With the following process a pure white color as well as a much cheaper white lead is obtained, and which is of a good quality.

In order to obtain our white lead we proceed as follows: We take sulphate of lead and carbonate of baryta in the proportion of one hundred parts by weight of carbonate of baryta to every one hundred and fifty-two parts of sulphate of lead, and place in a vessel to which water is added and the mixture stirred until it is all reduced to a thin paste. After it has been well combined by thorough stirring, the mixture is well heated for three or four hours to a temperature of about 160°, though this temperature may be considerably lower or carried up to near the boiling point without materially affecting the result, the stirring being continued as well during this part of the process. This will cause the following interchange of elements to take place, namely, the sulphuric acid of the sulphate of lead combines with the baryta, forming sulphate of baryta, and thus liberating carbonic acid, which unites with the lead, forming carbonate of lead. This is then dried in the ordinary way. The compound thus produced, it will be seen, is similar to the ordinary white lead, but with this advantage, the baryta being formed in it is consequently more thoroughly mixed and combined therewith, also being chemically found in the lead is much finer in texture than it could be rendered by any mechanical manipulation or means. Other salts of lead, excepting carbonates, may be substituted in place of sulphate of lead, but with the sulphate we have superior results.

What we claim as new, and desire to secure by Letters Patent, is—

The treatment of salts of lead (other than carbonates) and the carbonate of baryta, in the manner and for the purpose substantially as described.

THOMAS M. FELL,
AMBROSE. G. FELL.

Witnesses:
WM. H. BISHOP,
A. DE LACY.